(12) United States Patent
Kim et al.

(10) Patent No.: US 12,022,886 B2
(45) Date of Patent: Jul. 2, 2024

(54) AEROSOL GENERATING DEVICE AND OPERATION METHOD THEREOF

(71) Applicant: KT&G CORPORATION, Daejeon (KR)

(72) Inventors: Yong Hwan Kim, Gyeonggi-do (KR); Jeong Hoon Kim, Seoul (KR); Sung Wook Yoon, Gyeonggi-do (KR); Seung Won Lee, Gyeonggi-do (KR); Dae Nam Han, Seoul (KR)

(73) Assignee: KT&G CORPORATION, Daejeon (KR)

( * ) Notice: Subject to any disclaimer, the term of this patent is extended or adjusted under 35 U.S.C. 154(b) by 674 days.

(21) Appl. No.: 17/273,400

(22) PCT Filed: Dec. 14, 2020

(86) PCT No.: PCT/KR2020/018251
§ 371 (c)(1),
(2) Date: Mar. 4, 2021

(87) PCT Pub. No.: WO2021/145569
PCT Pub. Date: Jul. 22, 2021

(65) Prior Publication Data
US 2022/0408841 A1    Dec. 29, 2022

(30) Foreign Application Priority Data

Jan. 15, 2020 (KR) .................. 10-2020-0005609

(51) Int. Cl.
*A24F 40/65* (2020.01)
*A24F 40/53* (2020.01)
(Continued)

(52) U.S. Cl.
CPC .............. *A24F 40/65* (2020.01); *A24F 40/53* (2020.01); *A24F 40/60* (2020.01); *G06F 21/35* (2013.01); *A24F 40/10* (2020.01); *A24F 40/20* (2020.01)

(58) Field of Classification Search
CPC .......... A24F 40/65; A24F 40/53; A24F 40/60; A24F 40/10; G06F 21/35
See application file for complete search history.

(56) References Cited

U.S. PATENT DOCUMENTS

| 4,615,681 A | 10/1986 | Schwarz |
| 8,851,081 B2 | 10/2014 | Fernando et al. |

(Continued)

FOREIGN PATENT DOCUMENTS

| CN | 103997921 A | 8/2014 |
| CN | 110691523 A | 1/2020 |

(Continued)

OTHER PUBLICATIONS

Communication dated Apr. 29, 2021 by the Korean Patent Office in application No. 10-2020-0005609.
(Continued)

*Primary Examiner* — Hae Moon Hyeon
(74) *Attorney, Agent, or Firm* — Sughrue Mion, PLLC

(57) ABSTRACT

An aerosol generating device includes: a heater configured to heat an aerosol generating material; a battery configured to supply power to the heater; a communication interface configured to communicate with an external device; and a processor configured to receive a result of user authorization from the external device through the communication interface and operate based on the result of the user authorization.

13 Claims, 8 Drawing Sheets

(51) Int. Cl.
  *A24F 40/60* (2020.01)
  *G06F 21/35* (2013.01)
  *A24F 40/10* (2020.01)
  *A24F 40/20* (2020.01)

(56) References Cited

U.S. PATENT DOCUMENTS

| | | | |
|---|---|---|---|
| 10,327,479 B2* | 6/2019 | Popplewell | A24F 40/53 |
| 2010/0163063 A1 | 7/2010 | Fernando et al. | |
| 2013/0340775 A1* | 12/2013 | Juster | H04L 12/1827 |
| | | | 131/273 |
| 2014/0345633 A1 | 11/2014 | Talon et al. | |
| 2015/0122252 A1 | 5/2015 | Frija | |
| 2015/0181945 A1* | 7/2015 | Tremblay | A24F 40/60 |
| | | | 131/328 |
| 2015/0230521 A1 | 8/2015 | Talon | |
| 2016/0158782 A1 | 6/2016 | Henry, Jr. et al. | |
| 2016/0337362 A1* | 11/2016 | Cameron | G06Q 20/3278 |
| 2016/0361452 A1* | 12/2016 | Blackley | A61L 9/14 |
| 2017/0046738 A1 | 2/2017 | Cameron | |
| 2018/0043114 A1 | 2/2018 | Bowen et al. | |
| 2018/0213849 A1 | 8/2018 | Qiu | |
| 2018/0263283 A1* | 9/2018 | Popplewell | A24B 15/167 |
| 2018/0271155 A1 | 9/2018 | Baker et al. | |
| 2018/0338527 A1* | 11/2018 | Sur | A24F 40/65 |
| 2019/0158938 A1* | 5/2019 | Bowen | H04W 4/20 |
| 2019/0166913 A1* | 6/2019 | Trzecieski | A61M 15/06 |
| 2020/0305512 A1 | 10/2020 | Lim et al. | |

FOREIGN PATENT DOCUMENTS

| | | |
|---|---|---|
| EP | 3545781 A1 | 10/2019 |
| KR | 10-1523088 B1 | 5/2015 |
| KR | 10-2016-0009678 A | 1/2016 |
| KR | 10-1717875 B1 | 3/2017 |
| KR | 10-2018-0045000 A | 5/2018 |
| KR | 10-2019-0011264 A | 2/2019 |
| KR | 10-2019-0131053 A | 11/2019 |
| WO | 2014195805 A2 | 12/2014 |
| WO | 2017/055795 A1 | 4/2017 |
| WO | 2018165758 A1 | 9/2018 |
| WO | 2019/104227 A1 | 5/2019 |
| WO | 2019/186148 A1 | 10/2019 |

OTHER PUBLICATIONS

International Search Report dated May 13, 2021 from the International Searching Authority in International Application No. PCT/KR2020/018251.
Extended European Search Report dated Nov. 4, 2021 in European Application No. 20859636.1.
Office Action dated Jun. 21, 2022 from the Japanese Patent Office in JP Application No. 2021-521377.
Office Action dated Apr. 11, 2023 from the Chinese Patent Office in Application No. 202080005829.4.

* cited by examiner

AEROSOL GENERATING DEVICE AND OPERATION METHOD THEREOF

CROSS-REFERENCE TO RELATED APPLICATIONS

This application is a National Stage of International Application No. PCT/KR2020/018251 filed Dec. 14, 2020, which claims priority under U.S.C. § 119(a) to Korean Patent Application No. 10-2020-0005609 filed on Jan. 15, 2020.

TECHNICAL FIELD

The disclosure relates to an aerosol generating device and an operation method thereof.

BACKGROUND ART

Recently, the demand for alternative methods of overcoming the shortcomings of general cigarettes has increased. For example, there is an increasing demand for a method of generating aerosols by heating an aerosol generating material, rather than by combusting cigarettes.

Because smoking habits may be different for each user using an aerosol generating device, there is a need to improve user convenience by customizing the aerosol generating device for each user.

In addition, when user information of a user using an aerosol generating device is stored in the aerosol generating device, the user information needs to be protected.

SUMMARY

One or more embodiments include an aerosol generating device and an operation method thereof. One or more embodiments include an apparatus and a method for authorizing a user using an aerosol generating device and determining operation of the aerosol generating device according to a result of the user authorization. One or more embodiments include a non-transitory computer-readable recording medium having recorded thereon a program for executing the operation method in a computer.

The technical problems to be solved by one or more embodiments are not limited to the technical problems as described above, and other technical problems may be solved from the following embodiments.

According to one or more embodiments, an aerosol generating device includes: a heater configured to heat an aerosol generating material; a battery configured to supply power to the heater; a processor; and a communication interface configured to communicate with an external device, wherein the communication interface receives a result of user authorization from the external device, and the processor is configured to operate according to the result of the user authorization.

According to one or more embodiments, only when a user is authorized, user-associated data may be acquired, and a user-associated function may be performed based on the user-associated data to strengthen the protection of user information. Accordingly, user convenience may be increased by enabling customization of an aerosol generating device. In addition, although when the user is unauthorized, the aerosol generating device may still perform basic functions that may not be customized, thereby increasing user convenience.

According to one or more embodiments, when a user replaces an aerosol generating device with another aerosol generating device, user-associated data for the aerosol generating device may be used to operate the other aerosol generating device, thereby easily and quickly customizing the other aerosol generating device.

DETAILED DESCRIPTION

Figure 1:
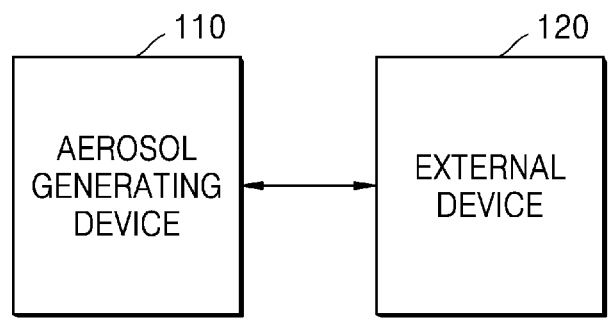
FIG. 1 is a block diagram illustrating a communication connection between an aerosol generating device and an external device according to an exemplary embodiment.

In accordance with an aspect of the inventive concept, there is provided an aerosol generating device including: a heater configured to heat an aerosol generating material; a battery configured to supply power to the heater; a communication interface configured to communicate with an external device; and a processor configured to: receive a result of user authorization from the external device through the communication interface; and operate based on the result of the user authorization.

The processor is further configured to: perform, in response to a user being authorized, a user-associated function based on user-associated data, and perform a user non-associated function based on user non-associated data, and perform, in response to the user being unauthorized, the user non-associated function based on the user non-associated data.

The aerosol generating device further includes a memory, and the processor is further configured to control, in response to the user being authorized, the memory to store the user-associated data.

In response to the user being authorized, the communication interface is further configured to receive, from the external device, user-associated data of the authorized user, and the processor is further configured to perform a user-associated function based on the user-associated data.

The user-associated data includes at least one of data acquired from the user and data acquired in a process of using the aerosol generating device, and the user non-associated data includes at least one of product-associated data and surrounding environment data.

The aerosol generating device further includes: a user interface configured to receive identification information of the user from the user, and the communication interface is further configured to transmit the identification information to the external device and receive, from the external device, the result of user authorization according to the identification information.

In accordance with an aspect of the inventive concept, there is provided a method of controlling an aerosol generating device. The method includes: receiving a result of user authorization from an external device through a communication interface; and operating the aerosol generating device based on the result of the user authorization.

The operating includes: in response to a user being authorized, performing a user-associated function based on user-associated data and performing a user non-associated function based on user non-associated data, and in response to the user being unauthorized, performing the user non-associated function based on the user non-associated data.

The receiving includes storing the user-associated data in a memory of the aerosol generating device in response to the user being authorized.

The receiving includes, in response to a user being authorized, receiving user-associated data of the authorized user from the external device through the communication interface, and the operating includes performing, in response to the user being authorized, a user-associated function based on the user-associated data.

The user-associated data includes at least one of data acquired from the user and data acquired in a process of using the aerosol generating device, and the user non-associated data includes at least one of product-associated data and surrounding environment data.

The receiving includes: receiving identification information of a user through a user interface; transmitting the identification information to the external device through the communication interface; and receiving, from the external device through the communication interface, the result of the user authorization according to the identification information.

In accordance with an aspect of the inventive concept, there is provide a system including: a first aerosol generating device; a second aerosol generating device; an external device; and a communication network establishing connection among the first aerosol generating device, the second aerosol generating device, and the external device. The first aerosol generating device: receives a result of user authorization from the external device through a first communication interface of the first aerosol generating device, in response to a user being authorized, performs a user-associated function based on user-associated data, and transmits the user-associated data to the external device. The second aerosol generating device: receives the result of the user authorization from the external device through a second communication interface of the second aerosol generating device, in response to the user being authorized, receives the user-associated data from the external device, and performs the user-associated function based on the user-associated data.

In accordance with an aspect of the inventive concept, there is provided a system including: a first aerosol generating device; a second aerosol generating device; and a communication network establishing connection between the first aerosol generating device and the second aerosol generating device. The first aerosol generating device: receives first identification information of a first user from the first user through a first user interface of the first aerosol generating device, authorizes the first user by comparing the first identification information with registration information stored in the first aerosol generating device, and performs, in response to the first user being authorized, a user-associated function based on user-associated data. The second aerosol generating device: receives second identification information of a second user from the second user through a second user interface of the second aerosol generating device, transmits the second identification information to the first aerosol generating device, based on the second identification information matching the first identification information, receives the user-associated data from the first aerosol generating device, and performs the user-associated function based on the user-associated data.

In accordance with an aspect of the inventive concept, there is provided a non-transitory computer-readable recording medium having recorded thereon a program for executing the method described above in a computer. As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element is referred to as being "over," "above," "on," "connected to" or "coupled to" another element, it can be directly over, above, on, connected or coupled to the other element or intervening elements may be present. In contrast, when an element is referred to as being "directly over," "directly above," "directly on," "directly connected to" or "directly coupled to" another element, there are no intervening elements present.

With respect to the terms used to describe the various embodiments, general terms which are currently and widely used are selected in consideration of functions of structural elements in the various embodiments of the present disclosure. However, meanings of the terms can be changed according to intention of one of ordinary skill in the art, judicial precedents, an emergence of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and in the context of the descriptions provided herein.

In addition, unless explicitly indicated otherwise, the term "comprise" and variations thereof such as "comprises" or "comprising" will be understood to imply the inclusion of stated elements but not the exclusion of any other elements. In addition, the terms "-er", "-or", and "module" may refer to units for processing at least one function and operation and can be implemented by hardware components or software components and combinations thereof.

Hereinafter, the present disclosure will now be described in more detail with reference to the accompanying drawings, in which exemplary embodiments of the present disclosure are shown such that one of ordinary skill in the art may easily understand and practice the embodiments of the present disclosure. The disclosure may, however, be embodied in many different forms and should not be construed as being limited to the embodiments set forth herein.

FIG. 1 is a block diagram illustrating a communication connection between an aerosol generating device and an external device according to an exemplary embodiment.

An aerosol generating device 110 may generally refer to a smoking system. In one embodiment, the aerosol generating device 110 may be an electrically heated smoking system for heating an aerosol generating material to generate an aerosol.

The aerosol generating device 110 may include a battery, a heater, a memory, a sensor, a communication interface, a user interface, and the like, but it will be understood by one of ordinary skill in the art related to the embodiments that some of the listed components may be omitted or additional components may be included.

In one embodiment, the aerosol generating device 110 may perform a user-associated function on the basis of user-associated data. The user-associated data may include data acquired from a user and data acquired in a process of using the aerosol generating device 110. The aerosol generating device 110 may acquire different user-associated data for each user.

The data acquired from the user may include personal information of the user and preference information of the user. For example, the personal information may include age, gender, address, occupation, identification information, and the like. In addition, the preference information may include a preferred type (e.g., a cigarette type, a liquid type, or the like), a preferred product for each type, a preferred flavor, and the like. The user may input the personal information and the preference information into the aerosol generating device 110.

The aerosol generating device 110 may perform the user-associated function based on the data acquired from the user. For example, the aerosol generating device 110 may perform a product recommendation function on the basis of at least one of the age, gender, preferred type, preferred product for each type, and preferred flavor of the user. Also, the aerosol generating device 110 may perform a selling branch recommendation function on the basis of the address of the user.

The data acquired in the process of using the aerosol generating device 110 may include a puff average strength, an average number of puffs per puff series, the number of times of smoking per day, smoking hours per day, a smoking area, a frequency of use for each product, and the like.

The aerosol generating device 110 may perform the user-associated function based on the data acquired in the process of using the aerosol generating device 110. For example, the aerosol generating device 110 may perform a heating function based on at least one of the puff average strength and the average number of puffs per puff series. Also, the aerosol generating device 110 may perform a replacement timing notification function based on the frequency of using each product. In addition, the aerosol generating device 110 may perform the selling branch recommendation function based on the smoking area.

Moreover, the aerosol generating device 110 may perform the user-associated function on the basis of the data acquired from the user and the data acquired in the process of using the aerosol generating device 110. For example, the aerosol generating device 110 may perform the product recommendation function on the basis of at least one of the age, gender, preferred type, preferred production for each type, preferred flavor, and frequency of use of each product of the user.

In one embodiment, the aerosol generating device 110 may perform a user non-associated function on the basis of user non-associated data. The user non-associated data may include product-associated data and surrounding environment data.

The product-associated data may include a product name, a product component, a temperature profile for each product, and the like. The aerosol generating device 110 may perform the user non-associated function based on the product-associated data. For example, the aerosol generating device 110 may perform the selling branch recommendation function based on the product name. Also, the aerosol generating device 110 may perform the heating function based on the temperature profile for each product.

The surrounding environment data may include time, weather, temperature, atmospheric pressure, and the like. The aerosol generating device 110 may perform the user non-associated function on the basis of the surrounding environment data. For example, the aerosol generating device 110 may perform the product recommendation function based on at least one of the current time, weather, and temperature. Also, the aerosol generating device 110 may perform a pressure correction function on the basis of at least one of the temperature and atmospheric pressure.

In addition, the aerosol generating device 110 may perform the user non-associated function on the basis of the product-associated data and the surrounding environment data. For example, the aerosol generating device 110 may perform the selling branch recommendation function on the basis of the product name and the current time.

Functions included in the user-associated function may be the same as or different from functions included in the user non-associated function. For example, the product recommendation function may be included in the user-associated function, but may not be included in the user non-associated function.

Alternatively, the product recommendation function may be included not only in the user-associated function, but also in the user non-associated function. However, data that is the basis of the user-associated function is user-associated data, and data that is the basis of the user non-associated function is user non-associated data. In other words, while functions of the user-associated function and functions of the user non-associated function may include the same set of functions, types of the data for the user-associated function and the user non-associated function may be different from each other. Therefore, operations of the user-associated function and operations of the user non-associated function may be different from each other.

For example, when the aerosol generating device 110 performs the heating function on the basis of the user-associated data (e.g., at least one of the puff average strength and the average number of puffs per puff series), the aerosol generating device 110 may perform the heating function according to a first temperature profile. When the aerosol generating device 110 performs the heating function on the basis of the user non-associated data (the temperature profile for each product), the aerosol generating device 110 may perform the heating function according to a second temperature profile.

The user-associated function and the user non-associated function are not limited to the above-described examples. In addition, the user-associated data and the user non-associated data are not limited to the above-described examples.

In another embodiment, the aerosol generating device 110 may use not only the user-associated data, but also the user non-associated data to perform the user-associated function. Alternatively, the aerosol generating device 110 may use not only the user non-associated data but also the user-associated data to perform the user non-associated function.

An external device 120 may be a smartphone, a tablet PC, a PC, a smart TV, a mobile phone, a personal digital assistant (PDA), a laptop, a media player, a micro server, a global positioning system (GPS) device, an e-book terminal, a digital broadcasting terminal, a navigation system, a kiosk, an MP3 player, a digital camera, a home appliance, or other mobile or non-mobile computing device, but is not limited thereto. Also, the external device 120 may be a wearable device such as a watch, glasses, a hair band, or a ring having a communication function and a data processing function. However, the external device 120 is not limited thereto and may include all types of devices capable of communicating with the aerosol generating device 110.

The aerosol generating device 110 and the external device 120 may communicate with each other.

In one embodiment, the aerosol generating device 110 and the external device 120 may communicate with through a network. In this case, the network may include a local area network (LAN), a wide area network (WAN), a value added network (VAN), a mobile radio communication network, a satellite communication network, and a combination thereof, and may generally refer to a data communication network enabling the aerosol generating device 110 and the external device 120 to smoothly communicate with each other, and may include wireless Internet and a mobile wireless communication network.

Wireless communication may be, for example, wireless LAN (Wi-Fi), Bluetooth, Bluetooth low energy, Zigbee, Wi-Fi Direct (WFD), ultra wideband (UWB), infrared data association (IrDA), near field communication (NFC), or the like, but is not limited thereto.

In another embodiment, the aerosol generating device 110 and the external device 120 may communicate with each other by wire. Wired communication may include, for example, a universal serial bus (USB), a high definition multimedia interface (HDMI), recommended standard 232 (RS-232), a plain old telephone service (POTS), or the like.

The aerosol generating device 110 and the external device 120 may communicate with each other to transmit and receive various types of data.

The aerosol generating device 110 may transmit the user-associated data to the external device 120. For example, the aerosol generating device 110 may transmit, to the external device 120, at least one of the data acquired from the user and the data acquired in the process of using the aerosol generating device 120.

Also, the aerosol generating device 110 may transmit the user non-associated data to the external device 120. For example, the aerosol generating device 110 may transmit, to the external device 120, at least one of the product-associated data and the surrounding environment data.

The external device 120 may store at least one of the user-associated data and the user non-associated data received from the aerosol generating device 110. At least one of the user-associated data and the user non-associated data may be stored in a memory of the external device 120.

In addition, the external device 120 may communicate with the aerosol generating device 110 through an Internet server and the network. At least one of the user-associated data and the user non-associated data may be stored in the Internet server via an application installed in the external device 120.

Although not illustrated in FIG. 1, the aerosol generating device 110 may be directly connected to the Internet server via the network without passing through the external device 120. In this case, the aerosol generating device 110 may transmit, to the Internet server, at least one of the user-associated data and the user non-associated data.

Figure 2:
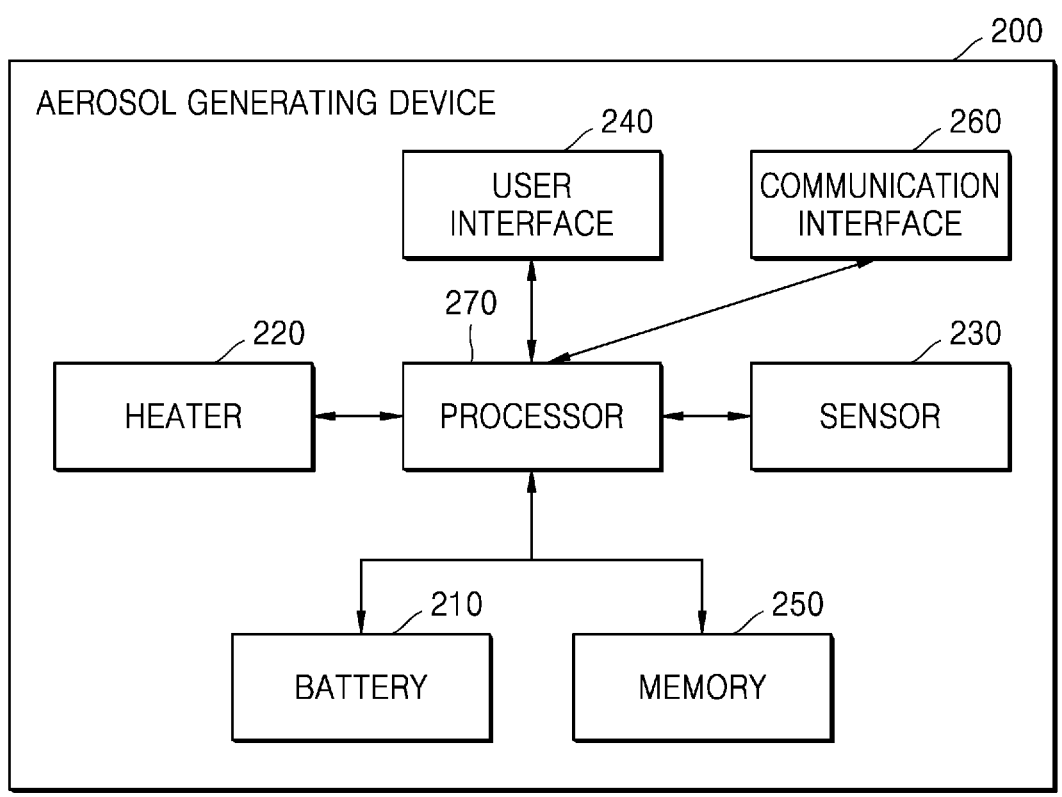
FIG. 2 is a block diagram illustrating hardware components of an aerosol generating device according to an exemplary embodiment.

FIG. 2 is a block diagram illustrating hardware components of an aerosol generating device according to an exemplary embodiment.

Referring to FIG. 2, an aerosol generating device 200 may include a battery 210, a heater 220, a sensor 230, a user interface 240, a memory 250, a communication interface 260, and a processor 270. However, the internal structure of the aerosol generating device 200 is not limited to that of FIG. 2. It will be understood by one of ordinary skill in the art related to the present embodiment that, according to the design of the aerosol generating device 200, some of the hardware components illustrated in FIG. 2 may be omitted or additional components may be included.

In one embodiment, the aerosol generating device 200 may include only a main body. In this case, the hardware components included in the aerosol generating device 200 are located in the main body. In another embodiment, the aerosol generating device 200 may include a main body and a cartridge, and the hardware components included in the aerosol generating device 200 may be divided and separately located in the main body and the cartridge. In addition, at least some of the hardware components included in the aerosol generating device 200 may be located in the main body and the cartridge, respectively.

Hereinafter, a space in which each of the components included in the aerosol generating device 200 is located is not limited, and operation of each of the components will be described.

The battery 210 supplies electric power for operating the aerosol generating device 200. For example, the battery 210 may supply power so that the heater 220 may be heated. Also, the battery 210 may supply power needed for operations of the other hardware components included in the aerosol generating device 200, i.e., operations of the sensor 230, the user interface 240, the memory 250, the communication interface 260, and the processor 270. The battery 210 may be a rechargeable battery or a disposable battery. For example, the battery 210 may be a lithium polymer (LiPoly) battery, but is not limited thereto.

The heater 220 may be supplied with power from the battery 210 under control of the processor 270. The heater 220 may be supplied with power from the battery 210 to heat a cigarette inserted into the aerosol generating device 200 or heat a cartridge inserted into the aerosol generating device 200.

The heater 220 may be located in the main body of the aerosol generating device 200. Alternatively, when the aerosol generating device 200 includes a main body and a cartridge, the heater 220 may be located in the cartridge. When the heater 220 is located in the cartridge, the heater 220 may be supplied with power from the battery 210 located in at least one of the main body and the cartridge.

The heater 220 may be formed of a suitable electro-resistive material. For example, the suitable electro-resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, or nichrome, but is not limited thereto. Also, the heater 220 may be implemented as a metal wire, a metal plate on which an electrically conductive track is arranged, a ceramic heating element, or the like, but is not limited thereto.

In one embodiment, the heater 220 may be a component included in the cartridge. The cartridge may include the heater 220, a liquid delivery element, and a liquid storage. An aerosol generating material accommodated in the liquid storage moves to the liquid delivery element, and the heater 220 may generate an aerosol by heating the aerosol generating material absorbed into the liquid delivery element. For example, the heater 220 may include a material such as nickel chrome and may be wound around the liquid delivery element or positioned adjacent to the liquid delivery element.

In another embodiment, the heater 220 may heat a cigarette inserted into an accommodation space of the aerosol generating device 200. When the cigarette is accommodated in the accommodation space of the aerosol generating device 200, the heater 220 may be located inside and/or outside the cigarette. Accordingly, the heater 220 may generate an aerosol by heating an aerosol generating material in the cigarette.

The heater 220 may be an induction heater. The heater 220 may include an electrically conductive coil for heating the cigarette or the cartridge by an induction heating method, and the cigarette or the cartridge may include a susceptor that may be heated by the induction heater.

The aerosol generating device 200 may include at least one sensor 230. A result sensed by the at least one sensor 230 may be transmitted to the processor 270, and according to the sensing result, the processor 270 may control the aerosol generating device 200 to perform various functions such as controlling operation of the heater 220, limiting smoking, determining whether the cigarette (or the cartridge) is inserted, and displaying a notification.

For example, the at least one sensor 230 may include a puff detecting sensor. The puff detecting sensor may detect a user's puff based on any one of a temperature change, a flow change, a voltage change, and a pressure change.

Also, the at least one sensor 230 may include a temperature detecting sensor. The temperature detecting sensor may detect a temperature at which the heater 220 (or the aerosol generating material) is heated. The aerosol generating device 200 may include a separate temperature detecting sensor for detecting a temperature of the heater 200, or instead of including the separate temperature detecting sensor, the heater 220 itself may operate as a temperature detecting sensor. Also, the heater 220 may operate as the temperature detecting sensor, and simultaneously, the aerosol generating device 200 may further include a separate temperature detecting sensor.

In addition, the at least one sensor 230 may include a position change detecting sensor. The position change detecting sensor may detect a change in a position of a slider coupled to the main body that moves with respect to the main body.

The user interface 240 may provide a user with information regarding a state of the aerosol generating device 200.

For example, the user interface 240 may include a display or a lamp for outputting visual information, a motor for outputting tactile information, a speaker for outputting audio information, and input/output (I/O) interface for receiving information input from the user or outputting information to the user (e.g., a button or touch screen).

In the aerosol generating device 200, only some of various examples of the user interface 240 illustrated above may be selected and implemented.

The memory 250 may be hardware that stores various types of data processed in the aerosol generating device 200. The memory 250 may store pieces of data processed by the processor 270 and pieces of data to be processed by the processor 270. The memory 250 may be implemented as various types such as random access memory (RAM), dynamic random access memory (DRAM), static random access memory (SRAM), read-only memory (ROM), and electrically erasable programmable read-only memory (EEPROM).

The memory 250 may store data regarding an operation time of the aerosol generating device 200, a maximum number of puffs, a number of puffs, at least one temperature profile, at least one power profile, and a user's smoking pattern, and the like.

The memory 250 may store at least one of user-associated data and user non-associated data. For example, the user-associated data may include data acquired from the user and data acquired in a process of using the aerosol generating device 200. The data acquired from the user may include personal information, preference information, and the like. The data acquired in the process of using the aerosol generating device 200 may include a puff average strength, an average number of puffs per puff series, the number of times of smoking per day, smoking hours per day, a smoking area, a frequency of use for each product, and the like.

For example, the user non-associated data may include product-associated data and surrounding environment data. The product-associated data may include a product name, a product component, a temperature profile for each product, and the like. The surrounding environment data may include time, weather, temperature, atmospheric pressure, and the like.

The communication interface 260 may communicate with an external device, an external server, or the like. For example, the communication interface 260 may be implemented in a form supporting at least one communication method of various types of digital interfaces, AP-based Wi-Fi (Wi-Fi, wireless LAN network), Bluetooth, Zigbee, wired/wireless local area network (LAN), WAN, Ethernet, IEEE 1394, HDMI, USB, MHL, AES/EBU, optical, coaxial, and the like. Also, the communication interface 260 may include a transition minimized differential signaling (TMDS) channel for transmitting video and audio signals, a display data channel (DDC) for transmitting and receiving device information and video or audio-associated information (e.g., enhanced extended display identification data (E-EDID), and consumer electronic control (CEC) for transmitting and receiving a control signal. The communication interface 260 may include any one or any combination of a digital modem, a radio frequency (RF) modem, a WiFi chip, and related software and/or firmware. However, the communication interface 260 is not limited thereto and may be implemented as various types of interfaces according to one or more embodiments.

The processor 270 is hardware that controls overall operation of the aerosol generating device 200. The processor 270 may include at least one processor. A processor may be implemented as an array of a plurality of logic gates or may be implemented as a combination of a microprocessor and a memory in which a program executable by the microprocessor is stored. Also, it will be understood by one of ordinary skill in the art to which the present embodiment pertains, that the processor may be implemented as other types of hardware.

The processor 270 may be configured to analyze a result sensed by the at least one sensor 230 and control respective operations to be performed.

Based on the result sensed by the at least one sensor 230, the processor 270 may control power supplied to the heater 220 so that operation of the heater 220 starts or ends. Also, based on the result sensed by the at least one sensor 230, the processor 270 may control an amount of power to be supplied to the heater 220 and a time at which power is to be supplied to the heater 220, so that the heater 220 may be heated to a predetermined temperature or maintain an appropriate temperature.

In one embodiment, the aerosol generating device 200 may have a plurality of modes. For example, one or more modes of the aerosol generating device 200 may include a preheating mode, an operation mode, an idle mode, and a sleep mode. However, the one or more modes of the aerosol generating device 200 are not limited thereto.

When the aerosol generating device 200 is not used, the aerosol generating device 200 may maintain the sleep mode, and the processor 270 may control output power of the battery 210 so that power is not supplied to the heater 220 in the sleep mode. For example, before the aerosol generating device 200 is used or after use of the aerosol generating device 200 ends, the aerosol generating device 200 may operate in the sleep mode.

The processor 270 may be configured to receive a user input for the aerosol generating device 200, and set the mode of the aerosol generating device 200 to the preheating mode (or change the mode of the aerosol generating device 200 from the sleep mode to the preheating mode) to start the operation of the heater 220.

Also, the processor 270 may detect the user's puff by using the puff detecting sensor and change the mode of the aerosol generating device 200 from the preheating mode to the heating mode.

In addition, when a time duration for which the aerosol generating device 200 operates in the heating mode exceeds a preset time duration, the processor 270 may change the mode of the aerosol generating device 200 from the heating mode to the idle mode.

Moreover, the processor 270 may count a number of puffs by using the puff detecting sensor, and when the number of puffs reaches a maximum number of puffs, the processor may control the battery to stop supplying power to the heater 220.

Temperature profiles respectively corresponding to the preheating mode, the heating mode, and the idle mode may be set. The processor 270 may control power to be supplied to the heater 220 based on a power profile for each mode, so that an aerosol generating material is heated according to a temperature profile for each mode.

The processor 270 may control the user interface 240 based on the result sensed by the at least one sensor 230. For example, the processor 270 may count the number of puffs by using the puff detecting sensor, and when the number of puffs reaches a preset number, the processor 270 may notify the user that the aerosol generating device 200 will end soon, by using at least one of a lamp, a motor, and a speaker.

Although not illustrated in FIG. 2, the aerosol generating device 200 and a separate cradle together may constitute an aerosol generating system. For example, the cradle may be used to charge the battery 210 of the aerosol generating device 200. For example, when the aerosol generating device 200 is accommodated in an accommodation space of the cradle, the aerosol generating device 200 may be supplied with power from a battery of the cradle to charge the battery 210 of the aerosol generating device 200.

Figure 3:
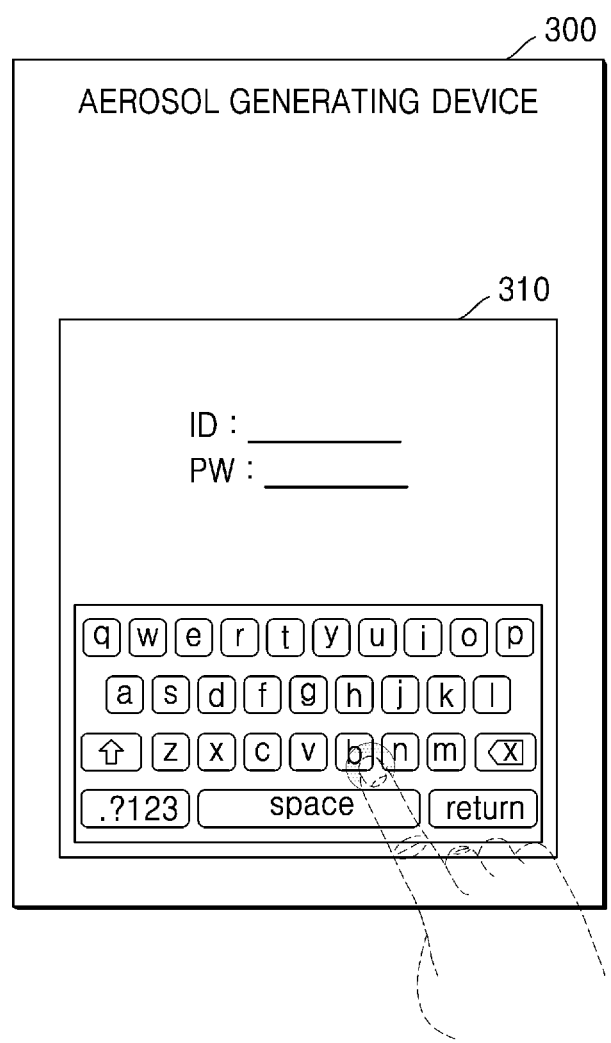
FIG. 3 is a diagram illustrating a user authorization process according to an exemplary embodiment.

FIG. 3 is a diagram illustrating a user authorization process according to an exemplary embodiment.

Referring to FIG. 3, an aerosol generating device 300 may include a user interface 310. In one embodiment, the user interface 310 may be a display for outputting visual information. Hereinafter, the user interface 310 is implemented as a touch screen.

A user may register unique identification information in at least one of the aerosol generating device 300, an external device, and an external server. The registered identification information may be used for user authorization.

The user interface 310 may receive identification information from the user. In one embodiment, the identification information may include an identification (ID) and a password (PW). The user interface 310 of FIG. 3 may be a screen for a process in which the user registers the identification information or a screen for an authorization process after the identification information is registered.

In one embodiment, the aerosol generating device 300 may transmit, to the external device, the identification information of the user received through the user interface 310. The external device may store registration information regarding a plurality of users. The external device may perform user authorization by comparing the identification information entered by a user with the registration information of the plurality of users stored in the external device. The external device may perform the user authorization by identifying registration information matching the identification information received from the aerosol generating device 300. The external device may transmit a result of the user authentication to the aerosol generating device 300.

In another embodiment, the registration information regarding the plurality of users may be stored in the external server. In this case, the external device may transmit, to the external server, the identification information received from the aerosol generating device 300. When the external server performs the user authorization and transmits the result of the user authorization to the external device, the external device may transmit the result of the user authorization to the aerosol generating device 300.

Alternatively, the aerosol generating device 300 may directly transmit the identification information to the external server without passing through the external device. The external server may perform the user authorization and transmit the result of the user authorization to the aerosol generating device 300.

The aerosol generating device 300 may operate according to the result of the user authorization. In one embodiment, the aerosol generating device 300 may perform, in response to the user being authorized, a user-associated function on the basis of user-associated data. Also, the aerosol generating device 300 may perform, in response to the user being authorized, a user non-associated function on the basis of user non-associated data. Alternatively, the aerosol generating device 300 may perform, in response to the user being unauthorized, the user non-associated function based on the user non-associated data.

Figure 4:
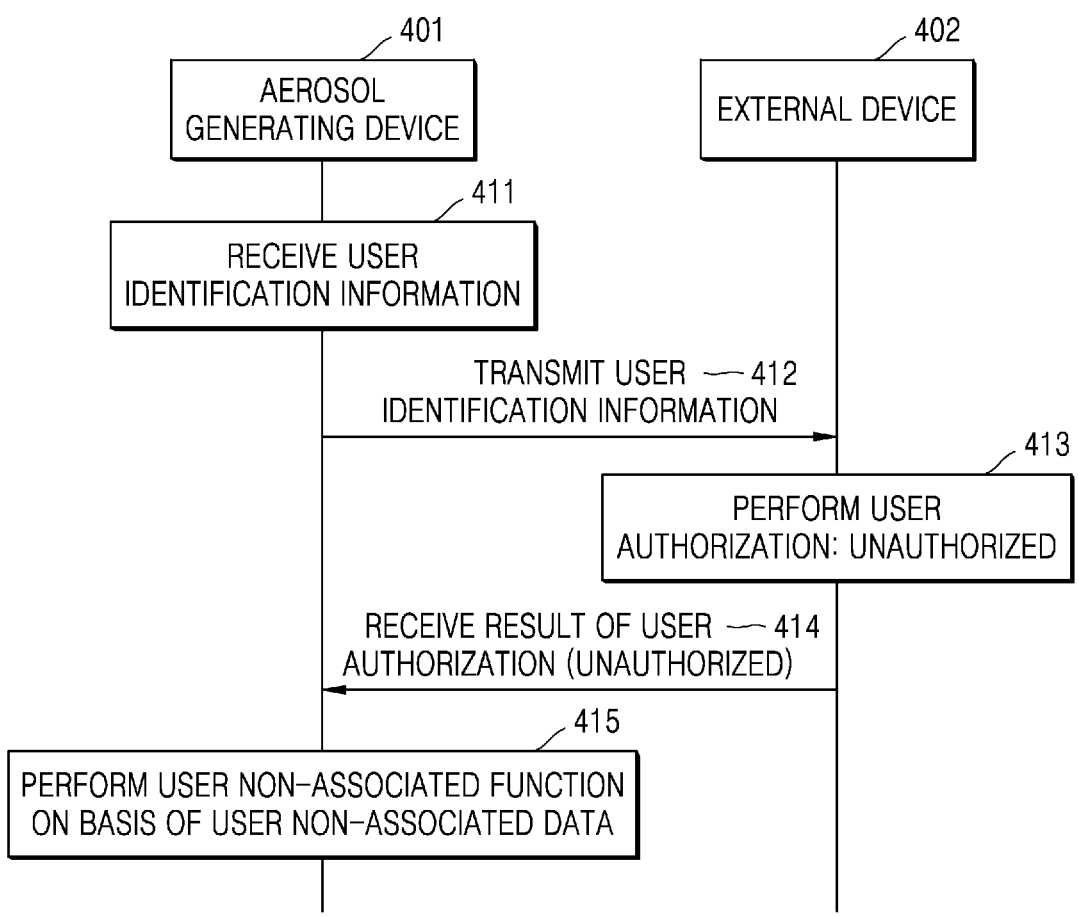
FIG. 4 is a flowchart illustrating operation of an aerosol generating device when a user is unauthorized according to an exemplary embodiment.

FIG. 4 is a flowchart illustrating operation of an aerosol generating device when a user is unauthorized, according to an exemplary embodiment.

Referring to FIG. 4, an aerosol generating device 401 may communicate with an external device 402. The aerosol generating device 401 and the external device 402 may communicate with each other via a network. Also, the aerosol generating device 401 and the external device 402 may communicate with each other by wire.

The external device 402 may be a smartphone, a tablet PC, a PC, a smart TV, a mobile phone, a PDA, or the like but is not limited thereto, and may include all types of devices capable of communicating with the aerosol generating device 401.

In operation 411, the aerosol generating device 401 may receive identification information of a user. The identification information may include unique information of each user, for example, the identification information may include an ID and a PW. The user may register the identification information in at least one of the aerosol generating device 401, the external device 402, and an external server (not shown).

In one embodiment, the aerosol generating device 401 may receive the identification information of the user through a user interface.

In operation 412, the aerosol generating device 401 may transmit the identification information to the external device 402. The external device 402 may store registration information regarding a plurality of users.

In operation 413, the external device 402 may perform user authorization by comparing the identification information received from the aerosol generating device 401 with the registration information regarding the plurality of users stored in the external device 402.

When the external device 402 does not store registration information matching the identification information received from the aerosol generating device 401, the external device 402 may determine that the user is unauthorized.

In operation 414, the aerosol generating device 401 may receive a result of the user authorization from the external device 402. The aerosol generating device 401 may receive the result of the user authorization indicating that the user is unauthorized.

In operation 415, the aerosol generating device 401 may perform a user non-associated function based on user non-associated data.

The aerosol generating device 401 may perform, in response to the user being unauthorized, the user non-associated function based on the user non-associated data. The user non-associated data may include product-associated data and surrounding environment data.

The product-associated data may include a product name, a product component, a temperature profile for each product, and the like. The aerosol generating device 401 may perform the user non-associated function on the basis of the product-associated data. For example, the aerosol generating device 401 may perform a selling branch recommendation function on the basis of the product name. Also, the aerosol generating device 401 may perform a heating function on the basis of the temperature profile for each product.

The surrounding environment data may include time, weather, temperature, atmospheric pressure, and the like. The aerosol generating device 401 may perform the user non-associated function on the basis of the surrounding environment data. For example, the aerosol generating device 401 may perform a product recommendation function based on at least one of the time, weather, and temperature. Also, the aerosol generating device 401 may perform a pressure correction function based on at least one of the temperature and atmospheric pressure.

Figure 5:
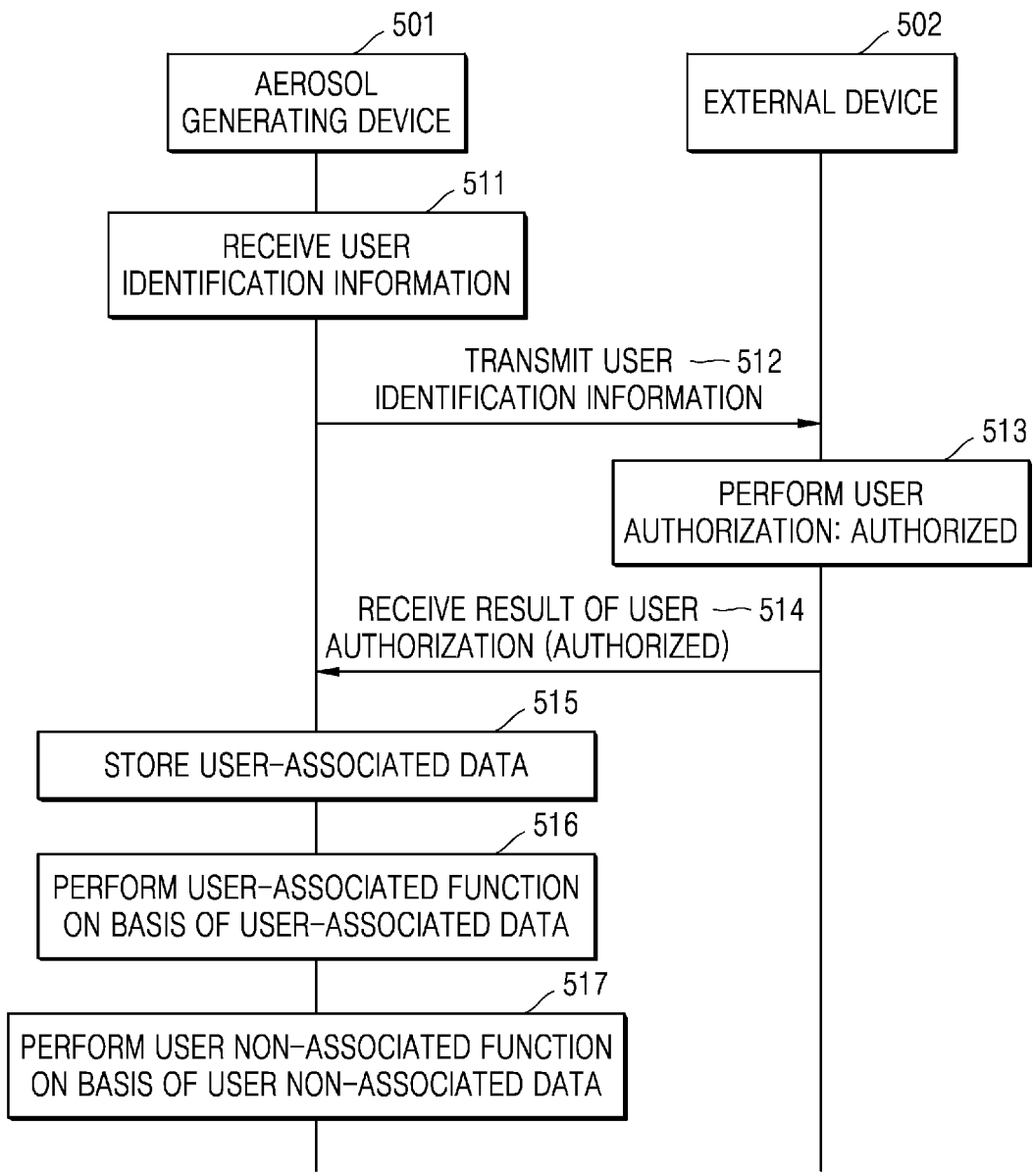
FIG. 5 is a flowchart illustrating operation of an aerosol generating device when a user is authorized according to an exemplary embodiment.

FIG. 5 is a flowchart illustrating operation of an aerosol generating device when a user is authorized according to an exemplary embodiment.

In operation 511, an aerosol generating device 501 may receive identification information of a user. In one embodiment, the aerosol generating device 501 may receive the identification information of the user through a user interface.

In operation 512, the aerosol generating device 501 may transmit the identification information to an external device 502. The external device 502 may store registration information regarding a plurality of users.

In operation 513, the external device 502 may perform user authorization by comparing the identification information received from the aerosol generating device 501 with the registration information regarding the plurality of users stored in the external device 502.

When the external device 502 stores registration information matching the identification information received from the aerosol generating device 501, the external device 502 may determine that the user is authorized.

In operation 514, the aerosol generating device 501 may receive a result of the user authorization from the external device 502. The aerosol generating device 501 may receive the result of the user authorization indicating that the user is authorized.

In operation 515, the aerosol generating device 501 may store user-associated data in response to the user being authorized.

The user-associated data may include data acquired from the user and data acquired in a process of using the aerosol generating device 501. The aerosol generating device 501 may acquire different user-associated data for each user.

The data acquired from the user may include personal information of the user and preference information of the user. For example, the personal information may include age, gender, address, occupation, identification information, and the like. Also, the preference information may include a preferred type (e.g., a cigarette type, a liquid type, or the like), a preferred product for each type, a preferred flavor, and the like. The user may input the personal information and the preference information into the aerosol generating device 501.

In operation 516, the aerosol generating device 501 may perform a user-associated function based on the user-associated data.

The aerosol generating device 501 may perform the user-associated function on the basis of the data acquired from the user. For example, the aerosol generating device 501 may perform a product recommendation function based on at least one of the age, gender, preferred type, preferred product for each type, and preferred flavor of the user. Also, the aerosol generating device 501 may perform a selling branch recommendation function based on an address of the user.

The data acquired in the process of using the aerosol generating device 501 may include a puff average strength, an average number of puffs per puff series, the number of times of smoking per day, smoking hours per day, a smoking area, a frequency of use of each product, and the like.

The aerosol generating device 501 may perform the user-associated function on the basis of the data acquired in the process of using the aerosol generating device 501. For example, the aerosol generating device 501 may perform a heating function based on at least one of the puff average strength and the number of puffs per puff series. Also, the aerosol generating device 501 may perform a replacement timing notification function on the basis of the frequency of use of each product. In addition, the aerosol generating device 501 may perform the selling branch recommendation function on the basis of the smoking area.

Moreover, the aerosol generating device 501 may perform the user-associated function on the basis of the data acquired from the user and the data acquired in the process of using the aerosol generating device 501. For example, the aerosol generating device 501 may perform the product recommendation function based on at least one of the age, gender, preferred type, preferred product for each type, preferred flavor, and the frequency of use of each product.

In operation 517, the aerosol generating device 501 may perform a user non-associated function based on user non-associated data.

The aerosol generating device 501 may perform, in response to the user being authorized, the user non-associated function on the basis of the user non-associated data. Operation 517 is the same as operation 415, and thus the repetitive descriptions of operation 415 will be omitted.

The aerosol generating device 501 may use not only the user-associated data, but also use the user non-associated data to perform the user-associated function. Alternatively, the aerosol generating device 501 may use not only the user non-associated data, but also us the user-associated data to perform the user non-associated function.

Comparing FIG. 5 to FIG. 4, only when the aerosol generating device 501 receives, from the external device 502, the result of the user authorization indicating that the user is authorized, the aerosol generating device 501 may store the user-associated data and perform the user-associated function on the basis of the user-associated data. In other words, when the aerosol generating device 501 receives the result of the user authorization indicating that the user is unauthorized, the aerosol generating device 501 may not store the user-associated data, and thus may not perform the user-associated function on the basis of the user-associated data.

In one embodiment, when the user-associated function and the user non-associated function include different functions, the aerosol generating device 501 may perform the user-associated function on the basis of the user-associated data only when the user is authorized.

For example, the replacement timing notification function may be included in the user-associated function but may not be included in the user non-associated function. When the user is authorized, the aerosol generating device 501 may perform the replacement timing notification function on the basis of the frequency of use of each product (i.e., the user-associated data). When the user is unauthorized, the aerosol generating device 501 may not acquire the frequency of use of each product (i.e., the user-associated data), and thus may not perform the replacement timing notification function.

In one embodiment, the user-associated function and the user non-associated function may include the same function. For example, the heating function may be included in both the user-associated function and the user non-associated function. When the user is authorized, the aerosol generating device 501 may perform the heating function based on at least one of the puff average strength and the average number of puffs per puff series (i.e., the user-associated data). In this case, the aerosol generating device 501 may perform the heating function according to a user-customized temperature profile.

When the user is unauthorized, the aerosol generating device 501 may perform the heating function on the basis of a temperature profile for each product (i.e., the user non-associated data). In this case, the aerosol generating device 501 may perform the heating function according to a product-customized temperature profile.

When the user-associated function and the user non-associated function include the same heating function, although the user is unauthorized, the aerosol generating device 501 may perform the heating function. However, the aerosol generating device 501 may perform only the heating function according to the product-customized temperature profile, and may not perform the heating function according to the user-customized temperature profile.

According to an embodiment, only when a user is authorized, user-associated data may be acquired, and a user-associated function may be performed on the basis of the user-associated data, thereby strengthening the protection of user information and simultaneously enabling customization of an aerosol generating device to increase user convenience. In addition, when the user is unauthorized, the aerosol generating device may still be able to perform functions that are less associated with the protection of user information, thereby increasing user convenience.

Figure 6:
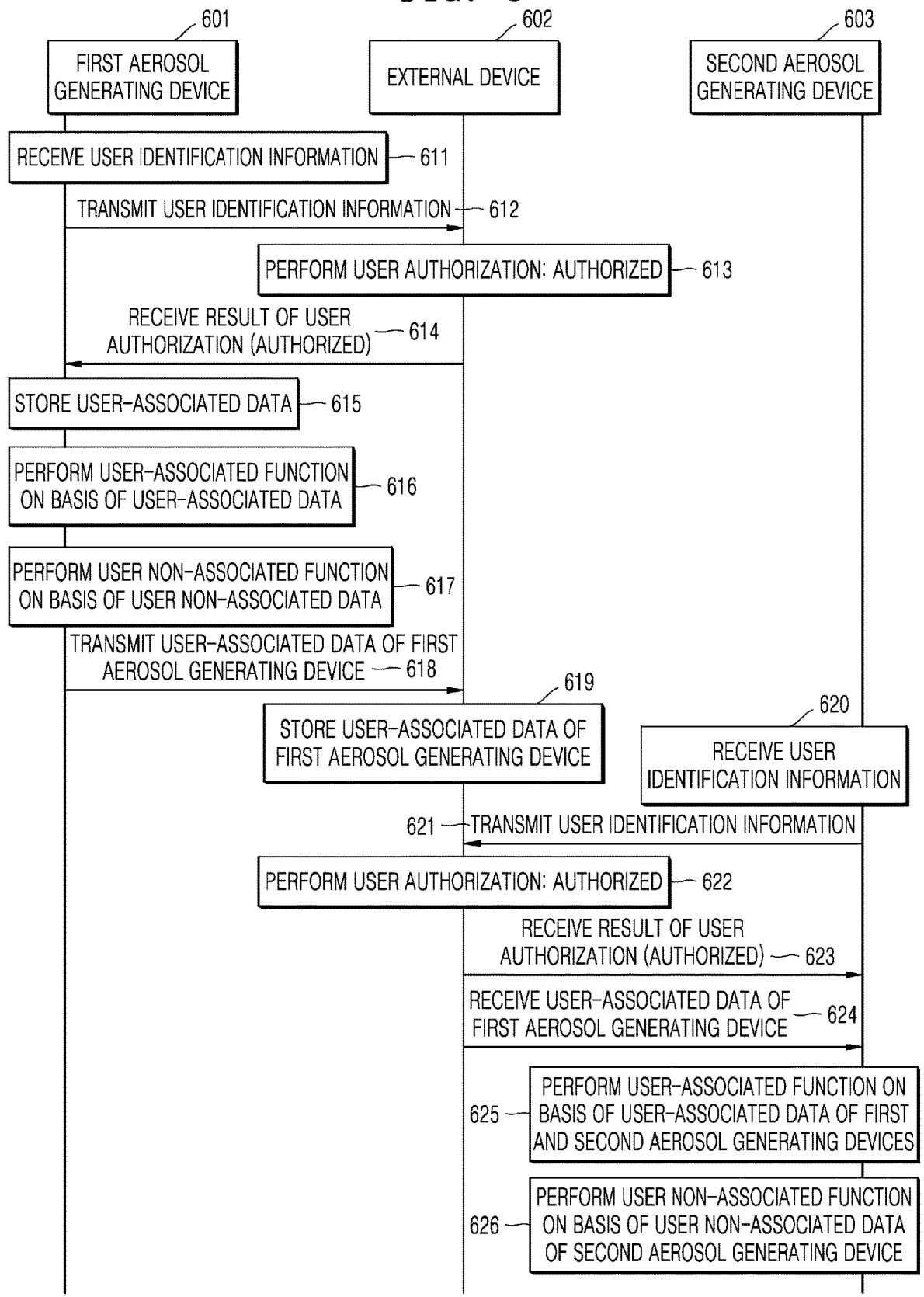
FIG. 6 is a flowchart illustrating a communication process among a first aerosol generating device, a second aerosol generating device, and an external device, according to an exemplary embodiment.

FIG. 6 is a flowchart illustrating a communication process among a first aerosol generating device, a second aerosol generating device, and an external device, according to an exemplary embodiment.

In FIG. 6, a first aerosol generating device 601 and a second aerosol generating device 603 may communicate with an external device 602. The first aerosol generating device 601 and the second aerosol generating device 603 may communicate with the external device 602 through a wireless network. Also, the first aerosol generating device 601 and the second aerosol generating device 603 may communicate with the external device 602 by wire.

In operation 611, the first aerosol generating device 601 may receive identification information of a user from the user. In one embodiment, the first aerosol generating device 601 may receive the identification information of the user through a user interface.

In operation 612, the first aerosol generating device 601 may transmit the identification information to the external device 602. The external device 602 may store registration information regarding a plurality of users.

In operation 613, the external device 602 may perform user authorization by comparing the identification information received from the first aerosol generating device 601 with the registration information regarding the plurality of users stored in the external device 602.

When the external device 602 stores registration information matching the identification information received from the first aerosol generating device 601, the external device 602 may determine that the user is authorized.

In operation 614, the first aerosol generating device 601 may receive a result of the user authorization from the external device 602. The first aerosol generating device 601 may receive the result of the user authorization indicating that the user is authorized.

In operation 615, the first aerosol generating device 601 may store user-associated data in response to the user being authorized.

In operation 616, the first aerosol generating device 601 may perform a user-associated function on the basis of the user-associated data.

In operation 617, the first aerosol generating device 601 may perform a user non-associated function on the basis of user non-associated data.

In operation 618, the first aerosol generating device 601 may transmit the user-associated data of the first aerosol generating device 601 to the external device 602.

In operation 619, the external device 602 may store the user-associated data of the first aerosol generating device 601.

In one embodiment, the user-associated data of the first aerosol generating device 601 may be stored in a memory of the external device 602.

In one embodiment, the external device 602 may transmit the user-associated data of the first aerosol generating device 601 to an external server (not shown), so that the user-associated data of the first aerosol generating device 601 may be stored in the external server (not shown). For example, the user-associated data of the first aerosol generating device 601 may be stored in an Internet server via an application installed in the external device 602.

In operation 620, the second aerosol generating device 603 may receive the identification information of the user.

In operation 621, the second aerosol generating device 603 may transmit the identification information to the external device 602.

In operation 622, the external device 602 may perform the user authorization by comparing the identification information received from the second aerosol generating device 603 with the registration information regarding the plurality of users stored in the external device 602.

When the external device 602 stores registration information matching the identification information received from the second aerosol generating device 603, the external device 602 may determine that the user is authorized.

In operation 623, the second aerosol generating device 603 may receive the result of the user authorization from the external device 602. The second aerosol generating device 603 may receive the result of the user authorization indicating that the user is authorized.

When the user is determined to be authorized in operation 622, the external device 602 may additionally determine whether or not user-associated data regarding the authorized user is previously stored. When a user of the first aerosol generating device 601 is the same as a user of the second aerosol generating device 603 according to the result of the user authorization, the external device 602 may determine that the user-associated data regarding the authorized user is previously stored.

When the user of the first aerosol generating device 601 is the same as the user of the second aerosol generating device 603, operation 624 is performed. When the user of the second aerosol generating device 603 is authorized but is not the same as the user of the first aerosol generating device 601, operations 515 through 517 of FIG. 5 may be performed.

In operation 624, the second aerosol generating device 603 may receive the user-associated data of the first aerosol generating device 601.

In operation 625, the second aerosol generating device 603 may perform the user-associated function based on the user-associated data of the first aerosol generating device 601 and user-associated data of the second aerosol generating device 603.

When the user of the first aerosol generating device 601 is the same as the user of the second aerosol generating device 603, the second aerosol generating device 603 may use the user-associated data of the first aerosol generating device 601.

For example, the user may replace the first aerosol generating device 601 with the second aerosol generating device 603. The first aerosol generating device 601 that is not replaced may acquire the user-associated data (e.g., a puff average strength, an average number of puffs per puff series, and the like) during a smoking process of the user and perform a heating function according to a user-customized temperature profile on the basis of the acquired user-associated data.

However, the second aerosol generating device 603 replacing the first aerosol generating device 601 may not yet have user-associated data. Here, the second aerosol generating device 603 may perform the heating function according to the user-customized temperature profile by acquiring the user-associated data of the first aerosol generating device 601 upon the user authorization.

In an embodiment, when product types of the first aerosol generating device 601 and the second aerosol generating device 603 are the same, the second aerosol generating device 603 may use and operate according to the user-associated data of the first aerosol generating device 601.

In another embodiment, when the product types of the first aerosol generating device 601 and the second aerosol generating device 603 are different from each other, the second aerosol generating device 603 may perform an updated user-associated function based on the user-associated data of the first aerosol generating device 601.

For example, an amount of a liquid used in the first aerosol generating device 601 may be 20 ml, and an amount of a liquid used in the second aerosol generating device 603 may be 10 ml. When a replacement timing notification function is performed 36 hours after opening a liquid in the first aerosol generating device 601, the replacement timing notification function may be performed when 18 hours elapse in the second aerosol generating device 603.

In operation 626, the second aerosol generating device 603 may perform the user non-associated function based on the user non-associated data of the second aerosol generating device 603.

According to an embodiment, when a user replaces a first aerosol generating device with a second aerosol generating device, the second aerosol generating device may operate by using user-associated data of the first aerosol generating device, thereby easily and quickly customizing the second aerosol generating device. Also, the protection of user information may be strengthened by enabling the use of user-associated data via user authorization.

The effects as described above may be achieved even when a particular user uses a plurality of aerosol generating devices.

Figure 7:
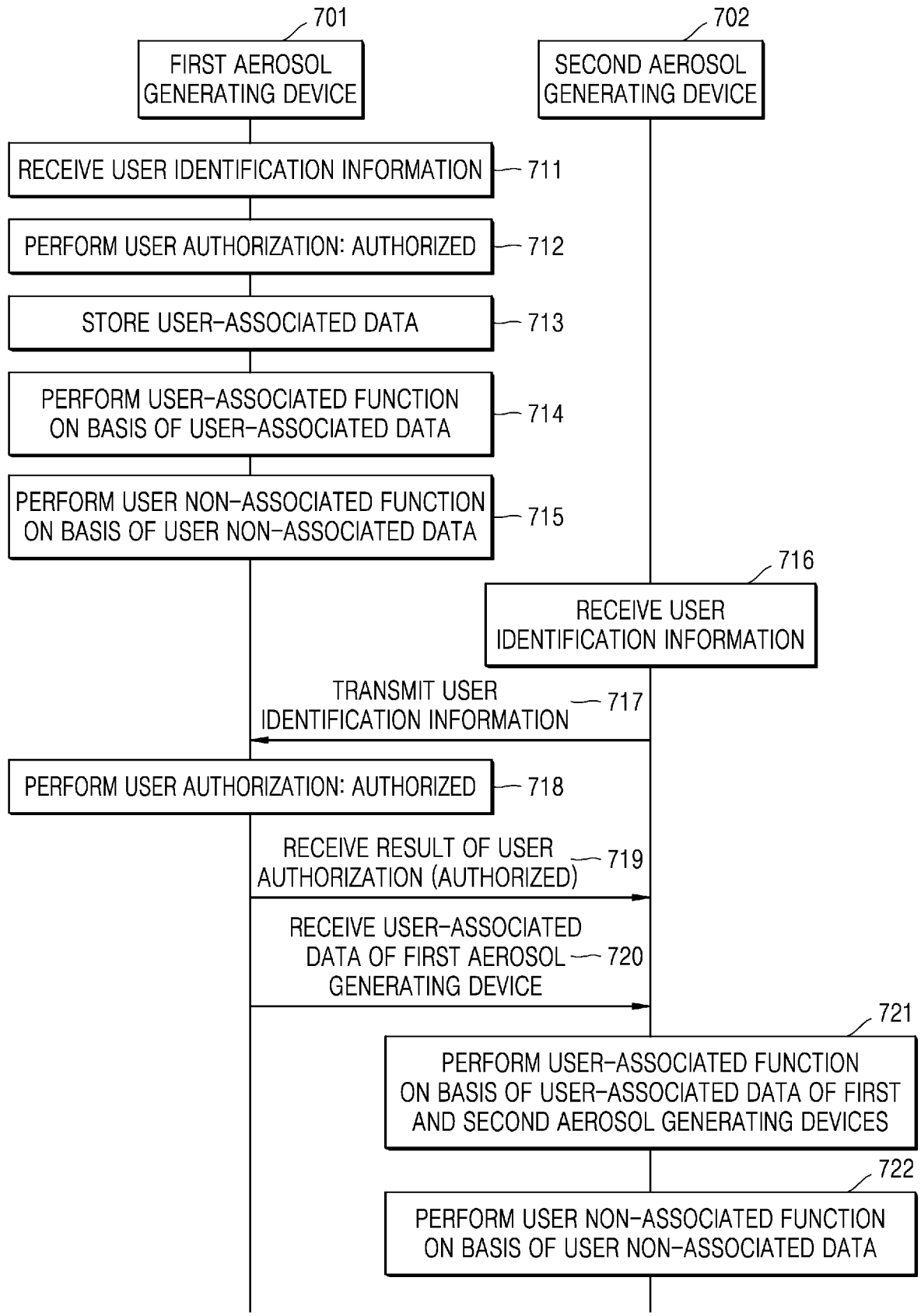
FIG. 7 is a flowchart illustrating a communication process between a first aerosol generating device and a second aerosol generating device according to an exemplary embodiment.

FIG. 7 is a flowchart illustrating a communication process between a first aerosol generating device and a second aerosol generating device according to an exemplary embodiment.

In FIG. 7, a first aerosol generating device 701 and a second aerosol generating device 702 may communicate with each other. The first aerosol generating device 701 and the second aerosol generating device 702 may communicate with each other through a wireless network. Also, the first aerosol generating device 701 and the second aerosol generating device 702 may communicate with each other by wire.

In operation 711, the first aerosol generating device 701 may receive identification information of a user. In one embodiment, the first aerosol generating device 701 may receive the identification information of the user through a user interface.

In operation 712, the first aerosol generating device 701 may authorize the identification information. Compared to FIGS. 4 through 6, in FIG. 7, the first aerosol generating device 701 may not receive a result of user authorization through an external device (not shown), and the first aerosol generating device 701 may directly perform the user authorization.

The first aerosol generating device 701 may store registration information regarding a plurality of users. The first aerosol generating device 701 may perform the user authorization by comparing the received identification information with the registration information regarding the plurality of users.

When the first aerosol generating device 701 stores registration information matching the identification information received from the user, the first aerosol generating device 701 may determine that the user is authorized.

In operation 713, the first aerosol generating device 701 may store user-associated data in response to the user being authorized.

In operation 714, the first aerosol generating device 701 may perform a user-associated function on the basis of the user-associated data.

In operation 715, the first aerosol generating device 701 may perform a user non-associated function on the basis of user non-associated data.

In operation 716, the second aerosol generating device 702 may receive the identification information of the user.

In operation 717, the second aerosol generating device 702 may transmit the identification information to the first aerosol generating device 701.

In operation 718, the first aerosol generating device 701 may perform the user authorization by comparing the identification information received from the second aerosol generating device 702 with the registration information regarding the plurality of users stored in the first aerosol generating device 701.

When the first aerosol generating device 701 stores registration information matching the identification information received from the second aerosol generating device 702, the first aerosol generating device 701 may determine that the user is authorized.

In operation 719, the second aerosol generating device 702 may receive a result of the user authorization from the first aerosol generating device 701. The second aerosol generating device 702 may receive the result of the user authorization indicating that the user is authorized.

In operation 718, when the user is determined to be authorized, the first aerosol generating device 701 may determine whether or not user-associated data regarding the authorized user is previously stored.

When a user of the first aerosol generating device 701 and a user of the second aerosol generating device 702 are the same, operation 720 may be performed. When the user of the second aerosol generating device 702 is authorized but is not the same as the user of the first aerosol generating device 701, operations 515 through 517 of FIG. 5 may be performed.

In operation 720, the second aerosol generating device 702 may receive the user-associated data of the first aerosol generating device 701.

In operation 721, the second aerosol generating device 702 may perform a user-associated function on the basis of the user-associated data of the first aerosol generating device 701 and user-associated data of the second aerosol generating device 702.

In operation 722, the second aerosol generating device 702 may perform a user non-associated function on the basis of user non-associated data of the second aerosol generating device 702.

It will be understood by one of ordinary skill in the art related to the present embodiment that the operations described with reference to FIGS. 4 through 7 may be sequentially performed, at least some of the operations may be simultaneously performed, or the order in which the operations are performed may be changed.

It will be understood by one of ordinary skill in the art related to the present embodiment that the descriptions in FIGS. 4 through 7 may also be applied to the other drawings.

Figure 8:
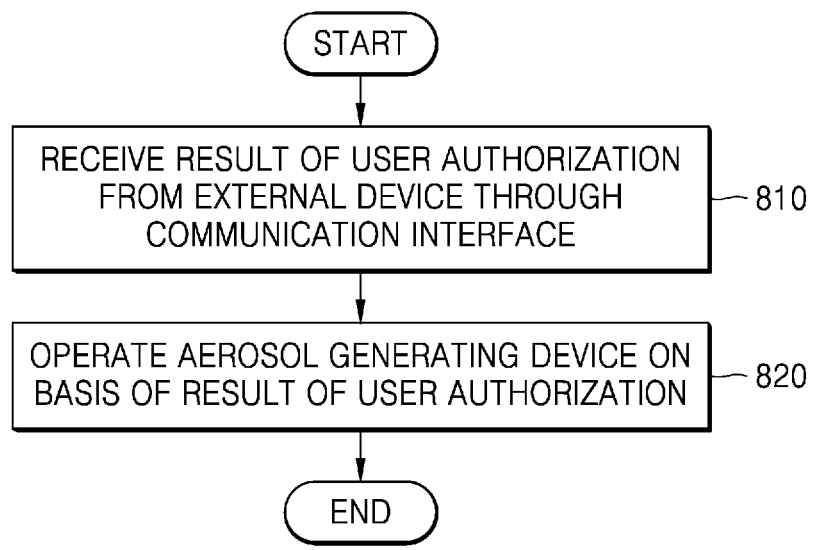
FIG. 8 is a flowchart illustrating a method of controlling an aerosol generating device according to an exemplary embodiment.

FIG. 8 is a flowchart illustrating a method of controlling an aerosol generating device according to an exemplary embodiment.

Referring to FIG. 8, in operation 810, a processor may receive a result of user authorization from an external device through a communication interface.

The processor may receive identification information of a user through a user interface. Also, the processor may transmit the identification information to the external device through the communication interface and receive the result of the user authorization from the external device.

The external device may perform the user authorization by comparing previously stored registration information with the identification information received from the communication interface of an aerosol generating device.

When the external device does not store registration information matching the identification information received from the aerosol generating device, the external device may determine that the user is unauthorized. In this case, the processor of the aerosol generating device may receive, through the communication interface, the result of the user authorization indicating that the user is unauthorized.

When the external device stores the registration information matching the identification information received from the aerosol generating device, the external device may determine that the user is authorized. In this case, the processor of the aerosol generating device may receive, through the communication interface, the result of the user authorization indicating that the user is authorized.

The external device may be an electronic device capable of communication such as a smartphone, a tablet PC, a PC, a smart TV, a mobile phone, a PDA, or the like or may be another aerosol generating device.

In one embodiment, the processor of the aerosol generating device may directly transmit the identification information to an external server (e.g., an Internet server) through the communication interface without passing through the external device. In this case, the external server may perform the user authorization, and the processor of the aerosol generating device may receive the result of the user authorization from the external server through the communication interface.

In operation 820, the processor of the aerosol generating device may operate based on the result of the user authorization.

In one embodiment, the processor may store user-associated data in a memory of the aerosol generating device in response to the user being authorized. The user-associated data may include data acquired from the user and data acquired in a process of using the aerosol generating device. The aerosol generating device may acquire different user-associated data for each user.

The processor may perform a user-associated function on the basis of the data acquired from the user, perform the user-associated function on the basis of the data acquired in the process of using the aerosol generating device, or may perform the user-associated function on the basis of both the two types of data.

Also, the processor may store user non-associated data in response to the user being unauthorized. The user non-associated data may include product-associated data and surrounding environment data. The processor may perform a user non-associated function on the basis of at least one of the product-associated data and the surrounding environment data.

In addition, the processor may use not only the user-associated data but also the user non-associated data to perform the user-associated function. Alternatively, the processor may use not only the user non-associated data but also the user-associated data to perform the user non-associated function.

In one embodiment, the processor may store the user non-associated data in the memory in response to the user being unauthorized. When the user is unauthorized, the processor may not store the user-associated data, and thus may not perform the user-associated function by using the user-associated data.

At least one of the components, elements, modules or units (collectively "components" in this paragraph) represented by a block in the drawings, such as the processor 270 in FIG. 2 may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

One or more embodiments of the disclosure may also be implemented in the form of a non-transitory computer-readable recording medium including instructions executable by a computer, such as a program module executable by the computer. A non-transitory computer-readable recording medium may be any available medium that can be accessed by a computer and includes both volatile and nonvolatile media, and removable and non-removable media. In addition, the non-transitory computer-readable recording medium may include both a computer storage medium and a communication medium. The computer storage medium includes all of volatile and nonvolatile, and removable and non-removable media implemented by any method or technology for storage of information such as computer-readable instructions, data structures, program modules or other data. The communication medium includes computer-readable instructions, data structures, other data in modulated data signals such as program modules, or other transmission mechanisms, and includes any information transfer media.

The above-described embodiments are merely examples, and it will be understood by one of ordinary skill in the art that various changes and equivalents thereof may be made. Therefore, the scope of the disclosure should be defined by the appended claims, and any modifications, substitutions, improvements or equivalents thereof should be construed as falling within the scope of the disclosure and the protection defined by the claims.

The invention claimed is:

1. An aerosol generating device comprising:
 a heater configured to heat an aerosol generating material;
 a battery configured to supply power to the heater;
 a communication interface configured to communicate with an external device; and
 a processor configured to:
  receive a result of a user authorization from the external device through the communication interface;
  in response to a user being authorized based on the result of the user authorization:
   perform a user-associated function based on user-associated data of the authorized user, and
   perform a user non-associated function based on user non-associated data; and
  in response to the user being unauthorized based on the result of the user authorization, perform the user non-associated function based on the user non-associated data.

2. The aerosol generating device of claim 1, further comprising a memory, wherein the processor is further configured to control, in response to the user being authorized, the memory to store the user-associated data of the authorized user.

3. The aerosol generating device of claim 1, wherein, in response to the user being authorized:
 the communication interface is further configured to receive, from the external device, the user-associated data of the authorized user.

4. The aerosol generating device of claim 1, wherein
 the user-associated data of the authorized user comprises at least one of data acquired from the user and data acquired in a process of using the aerosol generating device, and
 the user non-associated data comprises at least one of product-associated data and surrounding environment data.

5. The aerosol generating device of claim 1, further comprising:
 a user interface configured to receive identification information of the user from the user,
 wherein the communication interface is further configured to transmit the identification information to the external device and receive, from the external device, the result of the user authorization according to the identification information.

6. A method of controlling an aerosol generating device, the method comprising:
 receiving a result of a user authorization from an external device through a communication interface;
 in response to a user being authorized based on the result of the user authorization:
  performing a user-associated function based on user-associated data of the authorized user, and
  performing a user non-associated function based on user non-associated data; and
 in response to the user being unauthorized based on the result of the user authorization, performing the user non-associated function based on the user non-associated data.

7. The method of claim 6, wherein the receiving the result of the user authorization comprises storing the user-associated data of the authorized user in a memory of the aerosol generating device in response to the user being authorized.

8. The method of claim 6, wherein
the receiving the result of the user authorization comprises, in response to the user being authorized, receiving the user-associated data of the authorized user from the external device through the communication interface.

9. The method of claim 6, wherein
the user-associated data of the authorized user comprises at least one of data acquired from the user and data acquired in a process of using the aerosol generating device, and
the user non-associated data comprises at least one of product-associated data and surrounding environment data.

10. The method of claim 6, wherein the receiving the result of the user authorization comprises:
receiving identification information of the user through a user interface;
transmitting the identification information to the external device through the communication interface; and
receiving, from the external device through the communication interface, the result of the user authorization according to the identification information.

11. A non-transitory computer-readable recording medium having recorded thereon a program for executing the method of claim 6 in a computer.

12. A system comprising:
a first aerosol generating device;
a second aerosol generating device;
an external device; and
a communication network establishing connection among the first aerosol generating device, the second aerosol generating device, and the external device,
wherein the first aerosol generating device is configured to:
receive a result of a user authorization from the external device through a first communication interface of the first aerosol generating device, and
in response to a user being authorized based on the result of the user authorization:
perform a user-associated function based on user-associated data, and
transmit the user-associated data to the external device; and wherein the second aerosol generating device is configured to:
receive the result of the user authorization from the external device through a second communication interface of the second aerosol generating device, and
in response to the user being authorized:
receive the user-associated data from the external device that was transmitted by the first aerosol generating device to the external device, and
perform the user-associated function based on the user-associated data that was transmitted by the first aerosol generating device to the external device.

13. A system comprising:
a first aerosol generating device;
a second aerosol generating device; and
a communication network establishing connection between the first aerosol generating device and the second aerosol generating device,
wherein the first aerosol generating device is configured to:
receive first identification information of a first user from the first user through a first user interface of the first aerosol generating device,
authorize the first user by comparing the first identification information with registration information stored in the first aerosol generating device, and
in response to the first user being authorized, perform a user-associated function based on user-associated data; and
wherein the second aerosol generating device is configured to:
receive second identification information of a second user from the second user through a second user interface of the second aerosol generating device,
transmit the second identification information to the first aerosol generating device,
based on the second identification information matching the first identification information received by the first aerosol generating device, receive the user-associated data from the first aerosol generating device, and
perform the user-associated function based on the user-associated data.

* * * * *